United States Patent
Yoshioka et al.

(10) Patent No.: US 9,131,535 B2
(45) Date of Patent: Sep. 8, 2015

(54) ELECTRIC HEATING CATALYST

(75) Inventors: Mamoru Yoshioka, Susono (JP);
Noriaki Kumagai, Susono (JP); Naoya Takagi, Mishima (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 290 days.

(21) Appl. No.: 13/818,518

(22) PCT Filed: Aug. 23, 2010

(86) PCT No.: PCT/JP2010/064198
§ 371 (c)(1),
(2), (4) Date: Apr. 19, 2013

(87) PCT Pub. No.: WO2012/025982
PCT Pub. Date: Mar. 1, 2012

(65) Prior Publication Data
US 2013/0200060 A1    Aug. 8, 2013

(51) Int. Cl.
*B01D 50/00* (2006.01)
*H05B 1/00* (2006.01)
*F01N 3/20* (2006.01)
*F01N 13/14* (2010.01)
*F01N 13/16* (2010.01)

(52) U.S. Cl.
CPC .............. *H05B 1/00* (2013.01); *F01N 3/2026* (2013.01); *F01N 13/14* (2013.01); *F01N 13/16* (2013.01); *Y02T 10/26* (2013.01)

(58) Field of Classification Search
CPC ....... F01N 3/2026; F01N 12/14; F01N 13/16; H05B 1/00
USPC .................................... 422/174, 177
See application file for complete search history.

(56) References Cited

FOREIGN PATENT DOCUMENTS

| GB | 2425073 A | * 10/2006 |
| JP | 5 269387 | 10/1993 |
| JP | 05-96421 | * 12/1993 |
| JP | 5 96422 | 12/1993 |
| JP | 05-96424 | * 12/1993 |

OTHER PUBLICATIONS

International Search Report Issued Nov. 22, 2010 in PCT/JP10/64198 Filed Aug. 23, 2010.

* cited by examiner

*Primary Examiner* — Tom P Duong
(74) *Attorney, Agent, or Firm* — Oblon, McClelland, Maier & Neustadt, L.L.P.

(57) ABSTRACT

An object of the present invention is to suppress the decrease in the insulation resistance between an electrode and a case resulting from condensed water in an electric heating catalyst (EHC). The EHC includes a heat generating element which generates heat by applying electricity and which heats a catalyst, a case which accommodates the heat generating element, and an insulating member which is provided between the heat generating element and the case, and which provides insulation from electricity. An electrode chamber, which is a space formed around an electrode connected to the heat generating element, is occluded by an occluding member, which has an airtightness higher than those of the heat generating element and the insulating member, in the case of the EHC.

6 Claims, 8 Drawing Sheets

ELECTRIC HEATING CATALYST

TECHNICAL FIELD

The present invention relates to an electric heating catalyst provided for an exhaust gas passage of an internal combustion engine.

BACKGROUND ART

Conventionally, an electric heating catalyst (hereinafter referred to as "EHC"), in which a catalyst is heated by a heat generating element that generates the heat by applying the electricity, has been developed as an exhaust gas purification catalyst provided for an exhaust gas passage of an internal combustion engine.

In EHC, an insulating member, which provides insulation from electricity, is provided between the heat generating element which generates the heat by applying the electricity and a case which accommodates the heat generating element. For example, Patent Document 1 discloses such a technique for EHC that a mat composed of an insulator or insulating material is provided between a carrier which generates the heat by applying the electricity and a case which accommodates the carrier. The provision of the insulating member as described above makes it possible to suppress any short circuit formation between the heat generating element and the case.

PRECEDING TECHNICAL DOCUMENT

Patent Document

Patent Document 1: JP05-269387A.

SUMMARY OF THE INVENTION

Problem to be Solved by the Invention

An electrode chamber, which is a space for allowing an electrode to pass therethrough so that the electrode is connected to the heat generating element, is formed in the case for the heat generating element of EHC. The electrode chamber is formed by being surrounded by the insulating member and the heat generating element.

The exhaust gas, which flows through an exhaust tube, invades the insulating member and the heat generating element. The exhaust gas, which has passed through the insulating member the outer circumferential wall of the heat generating element, invades the inside of the electrode chamber formed as described above. The moisture is contained in the exhaust gas. Therefore, when the exhaust gas invades the inside of the electrode chamber, any condensed water appears in some cases in the electrode chamber on account of the condensation of moisture contained in the exhaust gas.

Further, any condensed water also appears in the exhaust tube in some cases on account of the condensation of moisture contained in the exhaust gas on the wall surface of the exhaust tube. When the condensed water appears in the exhaust tube, the condensed water flows along the inner wall surface of the exhaust tube by being pushed by the exhaust gas. When the condensed water arrives at EHC, the condensed water invades the insulating member and the heat generating element. When the condensed water invades the insulating member and the heat generating element, the condensed water (or the vapor produced by the evaporation of the condensed water), which has passed therethrough, invades the inside of the electrode chamber in some cases.

If the condensed water exists in the electrode chamber, it is feared that a short circuit may be formed by the condensed water between the electrode and the case. Further, if the vapor is produced by the evaporation of the condensed water, and the humidity is raised thereby in the electrode chamber, then it is also feared that the insulation resistance may be greatly lowered between the electrode and the case.

The present invention has been made taking the foregoing problem into consideration, an object of which is to suppress the decrease in the insulation resistance between an electrode and a case resulting from condensed water in EHC.

Means for Solving the Problem

In the present invention, an electrode chamber, which is a space formed around an electrode to be connected to a heat generating element, is occluded (closed or blockaded) by a highly airtight insulating member (material) which has an airtightness higher than those of the heat generating element and an insulating member.

In particular, EHC according to a first invention comprises:

a heat generating element which generates heat by applying electricity and which heats a catalyst by generating the heat;

a case which accommodates the heat generating element;

an insulating member which is provided between the heat generating element and the case, which supports the heat generating element, and which provides insulation from electricity;

an electrode which is connected to the heat generating element while passing through an electrode chamber and which supplies electricity to the heat generating element, the electrode chamber being a space positioned between an inner wall surface of the case and an outer circumferential surface of the heat generating element and the electrode chamber having a side wall surface formed by the insulating member; and an occluding member which is formed of such a highly airtight insulating material that the highly airtight insulating material has an airtightness higher than those of the heat generating element and the insulating member, and the highly airtight insulating material provides insulation from electricity and which covers a portion of the outer circumferential surface of the heat generating element for forming a wall surface of the electrode chamber and a portion of the insulating member for forming the side wall surface of the electrode chamber.

According to the present invention, the electrode chamber is occluded (closed or blockaded) by the occluding member having the high airtightness. Accordingly, it is possible to suppress that the exhaust gas and the condensed water allowed to pass through the insulating member or the heat generating element from invading the inside of the electrode chamber. Therefore, the decrease in the insulation resistance between the electrode and the case can be suppressed, which would be otherwise caused by the condensed water.

Further, EHC according to a second invention comprises:

a heat generating element which generates heat by applying electricity and which heats a catalyst by generating the heat;

a case which accommodates the heat generating element;

an insulating member which is provided between the heat generating element and the case, which supports the heat generating element, and which provides insulation from electricity;

an electrode which is connected to the heat generating element while passing through an electrode chamber and which supplies electricity to the heat generating element, the electrode chamber being a space positioned between an inner wall surface of the case and an outer circumferential surface of the heat generating element and the electrode chamber having a side wall surface formed by the insulating member; and an occluding member which is formed of such a highly airtight insulating material that the highly airtight insulating material has an airtightness higher than those of the heat generating element and the insulating member, and the highly airtight insulating material provides insulation from electricity and with which the electrode chamber is filled.

Further, EHC according to a third invention comprises:

a heat generating element which generates heat by applying electricity and which heats a catalyst by generating the heat;

a case which accommodates the heat generating element;

an insulating member which is provided between the heat generating element and the case, which supports the heat generating element, and which provides insulation from electricity;

an electrode which is connected to the heat generating element while passing through an electrode chamber and which supplies electricity to the heat generating element, the electrode chamber being a space positioned between an inner wall surface of the case and an outer circumferential surface of the heat generating element and the electrode chamber having a side wall surface formed by the insulating member; and an occluding member which is formed of such a highly airtight insulating material that the highly airtight insulating material has an airtightness higher than those of the heat generating element and the insulating member, and the highly airtight insulating material provides insulation from electricity and which covers the outer circumferential surface of the heat generating element and end surfaces of the insulating member disposed on an upstream side and a downstream side.

According to the inventions described above, the exhaust gas and the condensed water, which are allowed to pass through the insulating member or the heat generating element, can be also suppressed from invading the inside of the electrode chamber, in the same manner as in the first invention.

In EHC according to the first or second invention, it is also preferable that the occluding member is provided as a first occluding member, and EHC according to the first or second invention further comprises a second occluding member. In this construction, the second occluding member is formed of such a highly airtight insulating material that the highly airtight insulating material has an airtightness higher than those of the heat generating element and the insulating member and the highly airtight insulating material provides insulation from electricity, and the second occluding member covers a contact portion of the outer circumferential surface of the heat generating element to be brought in contact with the insulating member and end surfaces of the insulating member disposed on an upstream side and a downstream side. When EHC further comprises the second occluding member as described above, it is possible to suppress the exhaust gas and the condensed water from invading the inside of the electrode chamber at a higher probability.

When EHC according to the first or second invention comprises the second occluding member, it is also preferable to provide a condensed water holding member which is provided at a portion positioned at a lower position in the case on an upstream side from the electrode chamber between the case and the heat generating element and which holds the condensed water.

When the end surface of the insulating member disposed on the upstream side is covered with the occluding member, the condensed water, which is produced in the exhaust tube disposed on the upstream side from EHC, tends to stay in the vicinity of the end surface on the upstream side of the insulating member at the lower portion in the case. If the condensed water stays at this portion, a large amount of the condensed water sometimes flows at once into the lower portion of the heat generating element, for example, due to the vibration or the like. If a large amount of the condensed water flows at once into the heat generating element, it is feared that a problem may arise, for example, such that the heat generating element is locally cooled and the heat generating element is damaged thereby.

When the condensed water holding member is provided as described above, it is possible to suppress the condensed water from staying in the vicinity of the end surface on the upstream side of the insulating member at the lower portion in the case. As a result, it is possible to suppress the occurrence of, for example, any damage or breakage of the heat generating element caused by the inflow of the condensed water.

When the second occluding member is provided in EHC according to the first and second inventions, it is also preferable that the second occluding member covers a portion of the contact portion of the outer circumferential surface of the heat generating element to be brought in contact with the insulating member from which a portion disposed on an upstream side from the electrode chamber and positioned at a lower position in the case is excluded, a portion of the end surface of the insulating member disposed on the upstream side from which a portion positioned at a lower position in the case is excluded, and the end surface of the insulating member disposed on the downstream side. Accordingly, the function of the condensed water holding member as described above can be fulfilled by a portion of the insulating member positioned at the lower position in the case on the upstream side from the electrode chamber.

Even when the insulating member exists between the case and the heat generating element, if the condensed water invades the insulating member, then any short circuit is formed in some cases by the condensed water between the case and the heat generating element. In view of the above, it is also preferable that EHC according to the first to third inventions further comprises an inner tube which is provided between the case and the heat generating element. In this arrangement, the inner tube is supported by the insulating member while dividing the insulating member into those disposed on a case side and a heat generating element side.

The condensed water, which appears in the exhaust tube, travels along the inner wall surface of the case, and the condensed water arrives at the insulating member. The condensed water invades the insulating member on the case side. When the inner tube is provided as described above, the condensed water, which has invaded the insulating member, can be suppressed from entering the inside of the inner tube. Therefore, it is possible to suppress any short circuit which would be otherwise caused by the condensed water between the case and the heat generating element with the insulating member intervening therebetween.

Effect of the Invention

According to the present invention, it is possible to suppress any short circuit which would be otherwise caused by the condensed water between the electrode and the case in EHC.

MODE FOR CARRYING OUT THE INVENTION

A specified embodiment of the present invention will be explained below on the basis of the drawings. For example, the size (dimension), the material, the shape, and the relative arrangement of any constitutive part or component described in the embodiment of the present invention are not intended to limit the technical scope of the invention only thereto, unless otherwise specifically noted.

First Embodiment

[Schematic Arrangement of EHC]

Figure 1:
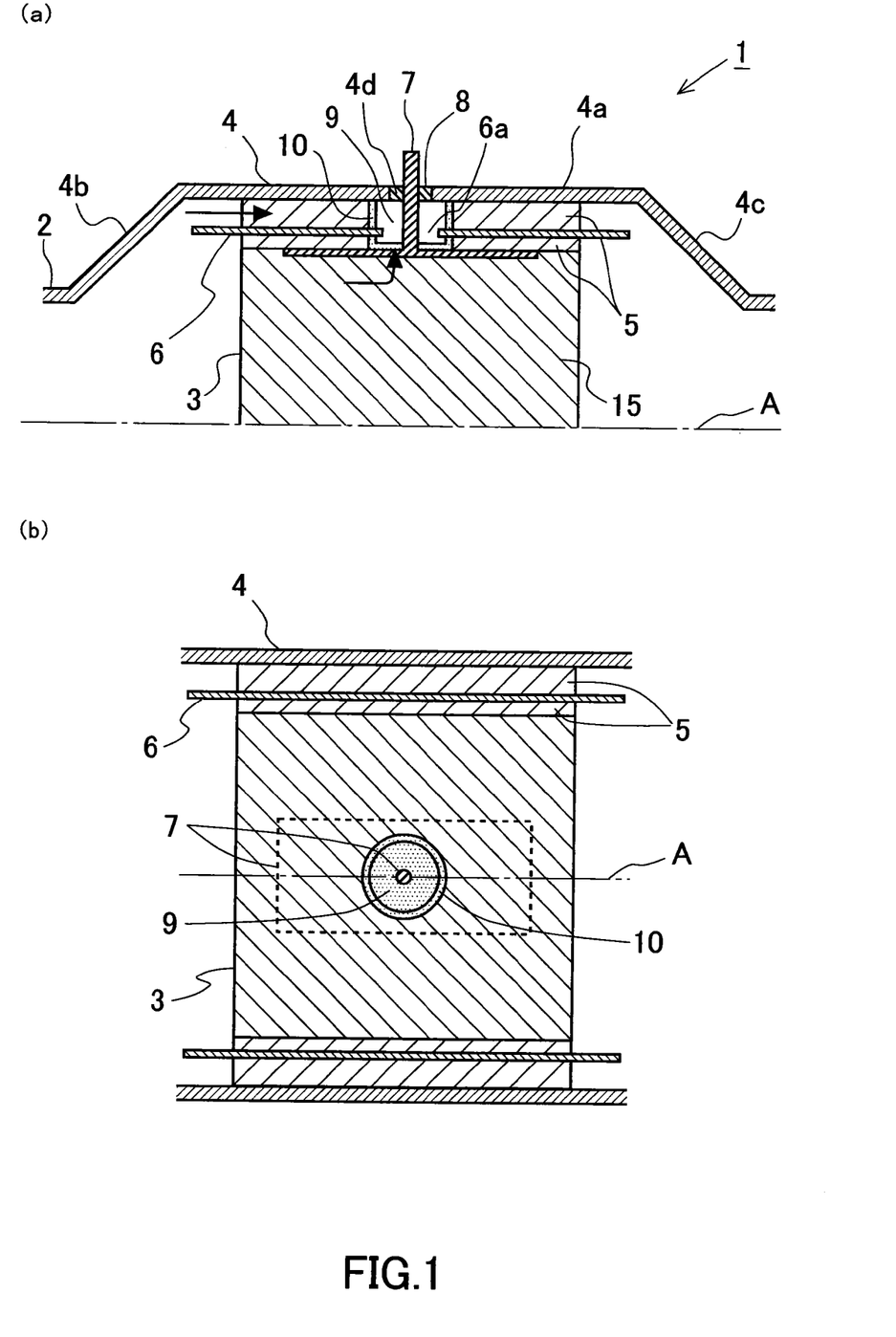
FIG. 1 shows a schematic arrangement of EHC according to a first embodiment.

FIG. 1 shows a schematic arrangement of an electric heating catalyst (EHC) according to this embodiment. EHC 1 according to this embodiment is provided for an exhaust tube of an internal combustion engine carried on a vehicle. The internal combustion engine may be either a diesel engine or a gasoline engine. EHC 1 according to this embodiment can be also used for a vehicle which adopts the hybrid system provided with an electric motor.

FIG. 1A shows a cross-sectional view in which EHC 1 is cut or sectioned in the vertical direction along the central axis A of the exhaust tube 2 of the internal combustion engine. The shape of EHC 1 is linearly symmetric in relation to the central axis A. Therefore, only an upper part of EHC 1 is shown in FIG. 1A for the purpose of convenience.

EHC 1 according to this embodiment is provided with a catalyst carrier 3, a case 4, a mat 5, an inner tube 6, and electrodes 7. The catalyst carrier 3 is formed to have a columnar shape, and the catalyst carrier 3 is installed so that the central axis thereof is coaxial with the central axis A of the exhaust tube 2. An exhaust gas purification catalyst 15 is carried on the catalyst carrier 3. The exhaust gas purification catalyst 15 can be exemplified, for example, by an oxidation catalyst, an absorption reduction type NOx catalyst, a selective reduction type NOx catalyst, and a three way catalyst.

The catalyst carrier 3 is formed of a material which behaves as an electric resistor to generate the heat when the electricity is applied. SiC can be exemplified as the material for the catalyst carrier 3. The catalyst carrier 3 has a plurality of passages which extend in the direction of the flow of the exhaust gas (i.e., in the direction of the central axis A) and which provide a honeycomb shape formed in a cross section perpendicular to the direction of the flow of the exhaust gas. The exhaust gas flows through the passages. The cross-sectional shape of the catalyst carrier 3, which is provided in relation to the direction perpendicular to the central axis A, may be, for example, an elliptic shape. The central axis A is the common central axis which is common to the exhaust tube 2, the catalyst carrier 3, the inner tube 6, and the case 4.

The catalyst carrier 3 is accommodated in the case 4. An electrode chamber 9 is formed in the case 4. Details of the electrode chamber 9 will be described later on. A pair of electrodes 7 (only one electrode is shown in FIG. 1) are connected to the catalyst carrier 3 while passing through the electrode chamber 9. The electricity is supplied to the electrode 7 from a battery (not shown). When the electricity is supplied to the electrode 7, the electricity is applied to the catalyst carrier 3. When the catalyst carrier 3 generates the heat by applying the electricity, then the exhaust gas purification catalyst 15, which is carried on the catalyst carrier 3, is heated, and the activation thereof is accelerated.

The case 4 is made of metal. The material for forming the case 4 can be exemplified by a stainless steel material. The case 4 has an accommodating portion 4a which is constructed to include a curved surface parallel to the central axis A, and tapered portions 4b, 4c which connect the accommodating portion 4a and the exhaust tube 2 on the upstream side and the downstream side from the accommodating portion 4a. The cross-sectional area of the passage of the accommodating portion 4a is larger than the cross-sectional area of the passage of the exhaust tube 2. The catalyst carrier 3, the mat 5, and the inner tube 6 are accommodated at the inside of the accommodating portion 4a. Each of the tapered portions 4b, 4c has such a tapered shape that the cross-sectional area of the passage is reduced at positions separated farther from the accommodating portion 4a.

The mat 5 is interposed between the inner wall surface of the accommodating portion 4a of the case 4 and the outer circumferential surface of the catalyst carrier 3. In other words, the catalyst carrier 3 is supported by the mat 5 in the case 4. Further, the inner tube 6 is interposed in the mat 5. In other words, the mat 5 is divided by the inner tube 6 into a portion disposed on the side of the case 4 and a portion disposed on the side of the catalyst carrier 3.

The mat 5 is formed of an electric insulator material. A ceramic fiber, which contains alumina as a main component, can be exemplified as the material for forming the mat 5. The mat 5 is wound around the outer circumferential surface of the catalyst carrier 3 and the outer circumferential surface of the inner tube 6. Owing to the fact that the mat 5 is interposed between the catalyst carrier 3 and the case 4, the electricity is suppressed from flowing to the case 4 when the electricity is applied to the catalyst carrier 3.

The inner tube 6 is formed of an electric insulator material. Alumina can be exemplified as the material for forming the inner tube 6. The inner tube 6 is formed to have a tubular shape about the center of the central axis A. As shown in FIG. 1, the length of the inner tube 6, which is provided in the direction of the central axis A, is longer than that of the mat 5. Therefore, the end portions of the inner tube 6, which are disposed on the upstream side and the downstream side, protrude from the end surfaces of the mat 5 which are disposed on the upstream side and the downstream side.

FIG. 1B illustrates the arrangement of the electrode chamber 9 formed in the case 4. FIG. 1B shows the arrangement of the electrode chamber 9 as viewed from a position over or above the case 4. As shown in FIG. 1A, through-holes 4d, 6a are bored through the case 4 and the inner tube 6 in order to allow the electrode 7 to pass therethrough. As shown in FIGS. 1A and 1B, a space is formed in the mat 5 in order to allow the electrode 7 to pass therethrough. In this way, the electrode chamber 9 according to this embodiment is formed by the space which is positioned between the inner wall surface of the case 4 and the outer circumferential surface of the catalyst carrier 3 and which has the side wall surface formed by the mat 5.

A support member 8, which supports the electrode 7, is provided in the through-hole 4d bored through the case 4 (i.e., at the upper portion of the electrode chamber 9). The support member 8 is formed of an electric insulator material, and the support member 8 is provided without any gap between the case 4 and the electrode 7.

In this embodiment, as shown in FIGS. 1A and 1B, the portion of the outer circumferential surface of the catalyst carrier 3 for forming the wall surface of the electrode chamber 9 and the portion of the mat 5 for forming the side wall surface of the electrode chamber 9 are covered with an occluding member 10. The occluding member 10 is formed of a highly airtight insulating material which has an airtightness higher than those of the material for forming the catalyst carrier 3 and the material for forming the mat 5 and which provides insulation from electricity.

It is necessary that the highly airtight insulating material for forming the occluding member 10 should have the heat resistance. The highly airtight insulating material can be exemplified, for example, by a black body coating material (agent) and a glass coating material (agent). The occluding member 10 can be also formed such that an enamel or glaze, which is usable for pottery or the like, is applied to the portion of the outer circumferential surface of the catalyst carrier 3 for forming the wall surface of the electrode chamber 9, followed by being sintered.

In this embodiment, the catalyst carrier 3 corresponds to the heat generating element according to the present invention. However, the heat generating element according to the present invention is not limited to the carrier for carrying the catalyst. For example, the heat generating element may be a structural member installed on the upstream side of the catalyst. In this embodiment, the case 4 corresponds to the case according to the present invention, and the mat 5 corresponds to the insulating member according to the present invention.

Function and Effect of Construction of EHC According to this Embodiment

In FIG. 1A, the arrows indicate the flows of the exhaust gas and the condensed water. The exhaust gas, which flows through the exhaust tube 2, invades the mat 5 and the catalyst carrier 3. If the exhaust gas passes through the outer circumferential wall of the catalyst carrier 3 or the mat 5, and the exhaust gas invades the inside of the electrode chamber 9, then the moisture contained in the exhaust gas is condensed, and thus the condensed water appears in the electrode chamber in some cases. When the condensed water appears in the exhaust tube 2, and the condensed water invades the mat 5 or the catalyst carrier 3, then the condensed water (or the vapor produced by the evaporation of the condensed water), which has passed therethrough, invades the inside of the electrode chamber 9 in some cases. If the condensed water invades the inside of the electrode chamber 9 or the condensed water appears at the inside of the electrode chamber 9, then it is feared that the insulation resistance between the electrode 7 and the case 4 in the electrode chamber 9 may be greatly lowered by the condensed water or the vapor produced by the evaporation of the condensed water.

In view of the above, in this embodiment, the electrode chamber 9 is occluded (closed or blockaded) by the occluding member 10 having the high airtightness. Accordingly, the exhaust gas and the condensed water, which have passed through the mat 5 or the catalyst carrier 3, can be suppressed from invading the inside of the electrode chamber 9. Therefore, the decrease in the insulation resistance between the electrode 7 and the case 4 can be suppressed, which would be otherwise caused by the condensed water.

If the end surfaces of the mat 5, which are disposed on the upstream side and the downstream side, are covered with the occluding member having the high airtightness, it is also possible to suppress the exhaust gas and the condensed water from invading the mat 5. However, in this case, it is difficult to suppress the invasion of the exhaust gas and the condensed water into the catalyst carrier 3. Therefore, it is feared that the exhaust gas or the condensed water may invade the inside of the electrode chamber 9 from the side of the catalyst carrier 3. Further, if the end surfaces of the mat 5, which are disposed on the upstream side and the downstream side, are covered with the occluding member, the occluding member is directly exposed to the exhaust gas flowing through the exhaust tube 2. As compared with this case, the occluding member 10 according to this embodiment is hardly exposed to the exhaust gas. Therefore, it is possible to suppress the deterioration of the occluding member 10.

When the electrode chamber 9 is formed around the electrode 7 as in this embodiment, the areal size of the wall surface of the electrode chamber 9 is smaller than the areal sizes of the end surfaces of the mat 5 disposed on the upstream side and the downstream side. Therefore, it is possible to decrease the amount of the occluding member to be used when the wall surface of the electrode chamber 9 is covered as compared with when the end surfaces of the mat 5 disposed on the upstream side and the downstream side are covered.

The condensed water, which is produced in the exhaust tube 2, flows along the inner wall surfaces of the exhaust tube 2 and the case 4, and the condensed water arrives at the mat 5. Therefore, the condensed water tends to invade any interstice or portion of the mat 5 between the inner circumferential surface of the accommodating portion 4a of the case 4 and the outer circumferential surface of the inner tube 6. In this embodiment, the condensed water, which has invaded the interstice or portion, is suppressed by the inner tube 6 from entering the inner side from the inner tube 6 (in the direction directed to the central axis A). As a result, any short circuit can be suppressed between the case 4 and the catalyst carrier 3 with the mat 5 intervening therebetween, which would be otherwise caused by the condensed water.

Further, in this embodiment, the end portions of the inner tube 6, which are disposed on the upstream side and the downstream side, protrude from the end surfaces of the mat 5 which are disposed on the upstream side and the downstream side. Accordingly, the condensed water, which flows along the inner wall surfaces of the exhaust tube 2 and the case 4 and which adheres to the end surface of the mat 5 disposed on the upstream side or the downstream side, is suppressed from entering the inner side from the inner tube 6. Therefore, any short circuit, which would be otherwise caused by the condensed water, can be suppressed between the case 4 and the catalyst carrier 3 with the mat 5 intervening therebetween at a higher probability.

Modified Embodiment

Figure 2:
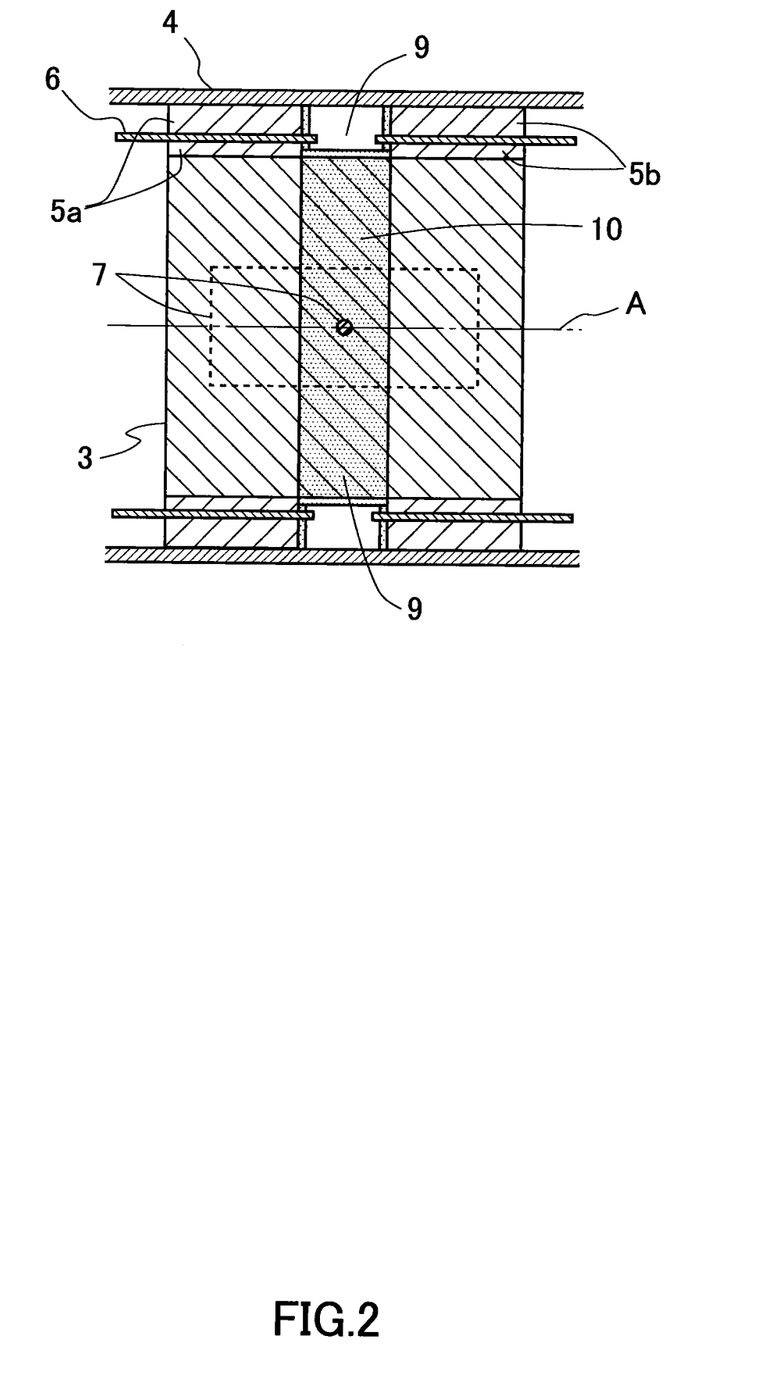
FIG. 2 shows a schematic arrangement of EHC according to a modified embodiment of the first embodiment.

FIG. 2 shows a schematic arrangement of EHC according to a modified embodiment of this embodiment. FIG. 2 shows a structure of an electrode chamber 9 as viewed from a position over or above the case 4. As shown in FIG. 2, in this modified embodiment, the mat 5 is divided into an upstream side portion 5a and a downstream side portion 5b in the case 4. In this arrangement, the electrode chamber 9 is formed over the entire circumference of the outer circumferential surface of the catalyst carrier 3 between the upstream side portion 5a and the downstream side portion 5b of the mat 5.

Also in this modified embodiment, the wall surface of the electrode chamber 9 is covered with the occluding member 10. In other words, the occluding member 10 covers the portion of the outer circumferential surface of the catalyst carrier 3 for forming the bottom surface of the electrode chamber 9, and the end surface on the downstream side of the upstream side portion 5a of the mat 5 and the end surface on the upstream side of the downstream side portion 5b of the mat 5 for forming the side surfaces of the electrode chamber 9. Accordingly, even when the mat 5 is divided into the upstream side portion 5a and the downstream side portion 5b, it is possible to occlude the electrode chamber 9 in the same manner as in the arrangement shown in FIG. 1. Therefore, the exhaust gas and the condensed water, which have passed through the mat 5 or the catalyst carrier 3, can be suppressed from invading the inside of the electrode chamber 9.

Second Embodiment

[Schematic Arrangement of EHC]

Figure 3:
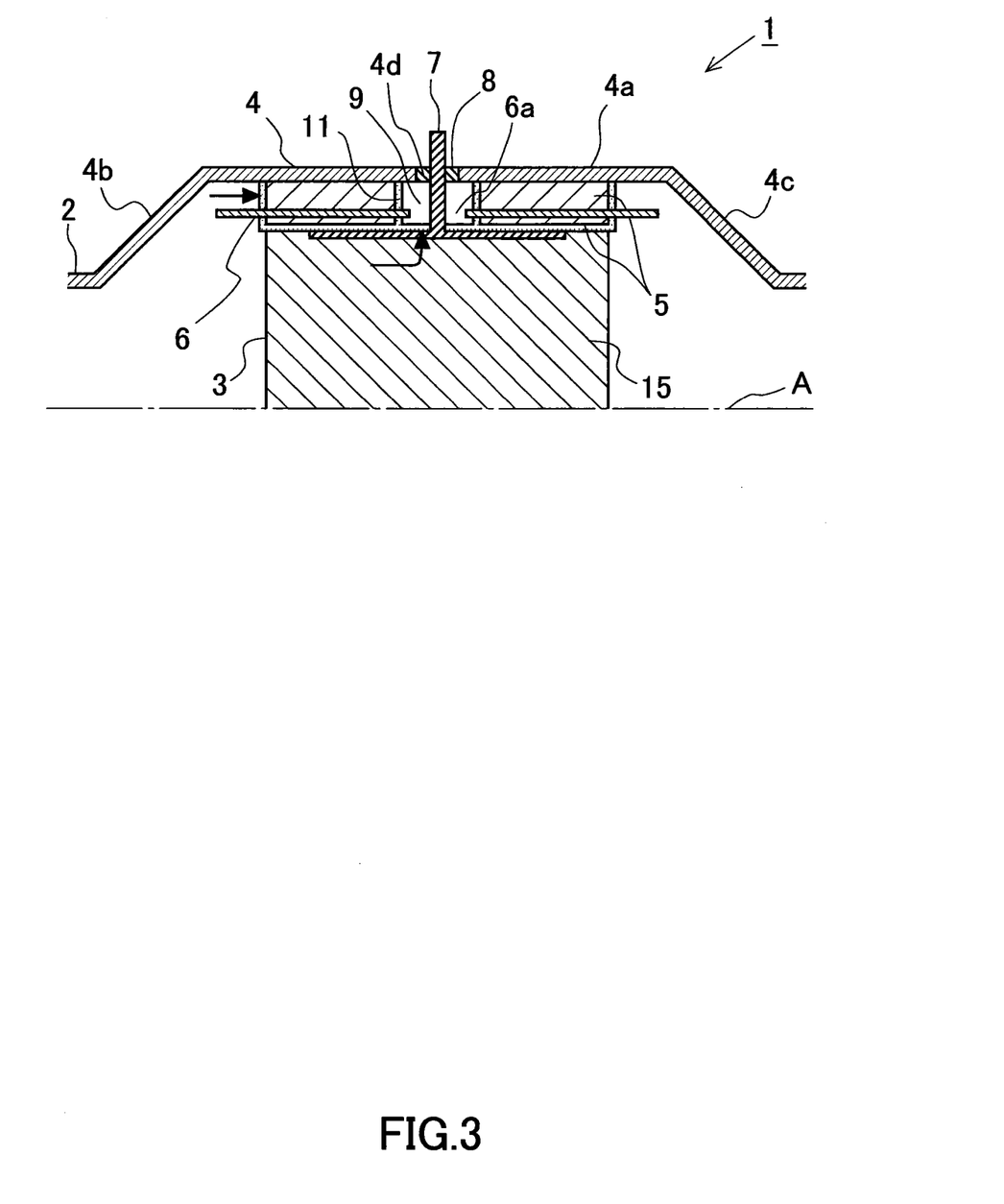
FIG. 3 shows a schematic arrangement of EHC according to a second embodiment.

FIG. 3 shows a schematic arrangement of EHC according to this embodiment. As shown in FIG. 3, in this embodiment, the entire outer circumferential surface of the catalyst carrier 3 and the end surfaces of the mat 5 disposed on the upstream side and the downstream side are covered with an occluding member 11 in addition to the wall surface of the electrode chamber 9. The occluding member 11 is formed of a highly airtight insulating material which has an airtightness higher than those of the material for forming the catalyst carrier 3 and the material for forming the mat 5 and which provides insulation from electricity, in the same manner as the occluding member 10 according to the first embodiment. The construction other than the above is the same as or equivalent to the construction of EHC according to the first embodiment.

In this embodiment, the portion of the occluding member 11, which covers the wall surface of the electrode chamber 9, corresponds to the first occluding member according to the present invention. Further, the portion of the occluding member 11 which covers the contact portion of the outer circumferential surface of the catalyst carrier 3 to be brought in contact with the mat 5 and the portions of the occluding member 11 which cover the end surfaces of the mat 5 disposed on the upstream side and the downstream side correspond to the second occluding member according to the present invention.

Function and Effect of Construction of EHC According to this Embodiment

In FIG. 3, the arrows indicate the flows of the exhaust gas and the condensed water. According to this embodiment, it is possible to suppress the invasion of the exhaust gas and the condensed water into the electrode chamber 9 from the mat 5 and the catalyst carrier 3, and it is also possible to suppress the invasion of the exhaust gas and the condensed water into the mat 5. Therefore, the exhaust gas and the condensed water can be suppressed from invading the inside of the electrode chamber 9 at a higher probability.

Modified Embodiment

Figure 4:
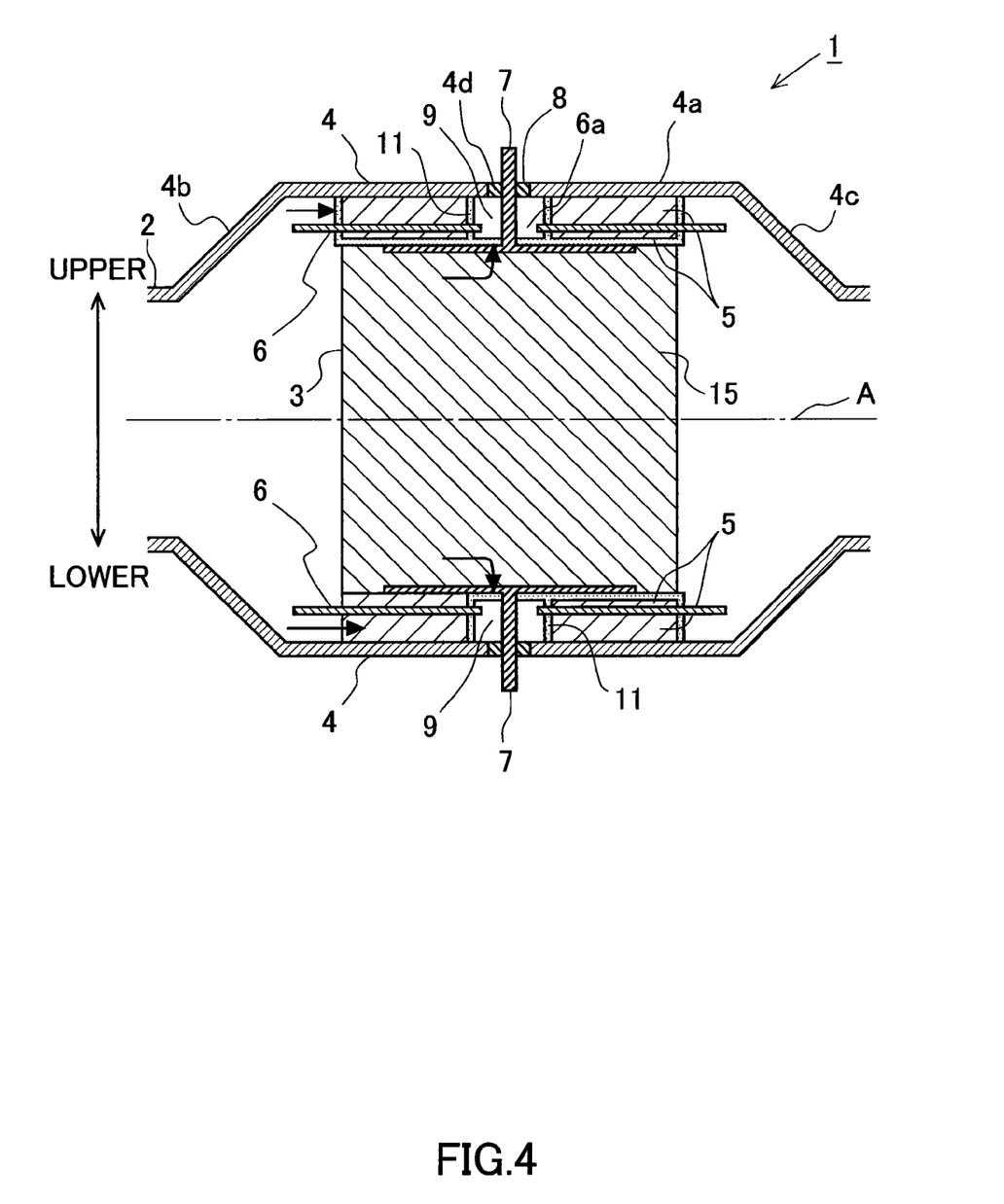
FIG. 4 shows a schematic arrangement of EHC according to a modified embodiment of the second embodiment.

FIG. 4 shows a schematic arrangement of EHC according to a modified embodiment of this embodiment. The condensed water, which is produced in the exhaust tube 2 disposed on the upstream side from EHC 1, tends to flow into the lower portion in the case 4 of EHC 1. In this context, when the end surface of the mat 5 disposed on the upstream side is covered with the occluding member 11 as shown in FIG. 3, the condensed water easily invades the inside of the mat 5. Therefore, the condensed water tends to stay in the vicinity of the end surface of the mat 5 on the upstream side at the lower portion in the case 4. If the condensed water stays at this portion, a large amount of the condensed water sometimes flows into the lower portion of the catalyst carrier 3 at once in accordance with, for example, the vibration. If a large amount of the condensed water flows into the catalyst carrier 3 at once, it is feared that any problem may arise, for example, such that the catalyst carrier 3 is locally cooled and thus the catalyst carrier 3 is damaged or broken.

In view of the above, in this modified embodiment, as shown in FIG. 4, the occluding member 11 does not cover the portion of the outer circumferential surface of the catalyst carrier 3 which is disposed on the upstream side from the electrode chamber 9 and which is positioned at the lower position in the case 4 and the portion of the end surface on the upstream side of the mat 5 which is positioned at the lower position in the case 4. In other words, in this modified embodiment, the occluding member 11 covers the wall surface of the electrode chamber 9, the portion of the contact portion of the outer circumferential surface of the catalyst carrier 3 to be brought in contact with the mat 5 from which the portion disposed on the upstream side from the electrode chamber 9 and positioned at the lower position in the case 4 is excluded, the portion of the end surface of the mat 5 disposed on the upstream side from which the portion positioned at the lower position in the case 4 is excluded, and the end surface of the mat 5 disposed on the downstream side.

Accordingly, the condensed water, which is produced in the exhaust tube 2 disposed on the upstream side from EHC 1 and which flows into the lower portion in the case 4, easily enters the inside of the mat 5 from the lower portion of the end surface of the mat 5 disposed on the upstream side. Therefore, the condensed water can be absorbed and retained by the mat 5. Therefore, the condensed water is suppressed from staying in the vicinity of the end surface of the mat 5 disposed on the upstream side at the lower portion in the case 4. As a result, it is possible to suppress a large amount of the condensed water from flowing into the catalyst carrier 3 at once.

Also in this modified embodiment, the wall surface of the electrode chamber 9 is covered with the occluding member 11. Therefore, the condensed water, which is absorbed by the mat 5, is suppressed from invading into the inside of the electrode chamber 9.

In this modified embodiment, it is also allowable that a condensed water absorbing member, which is different from the mat 5, is provided at the portion positioned at the lower position on the upstream side from the electrode chamber 9 in the case 4.

Third Embodiment

[Schematic Arrangement of EHC]

Figure 5:
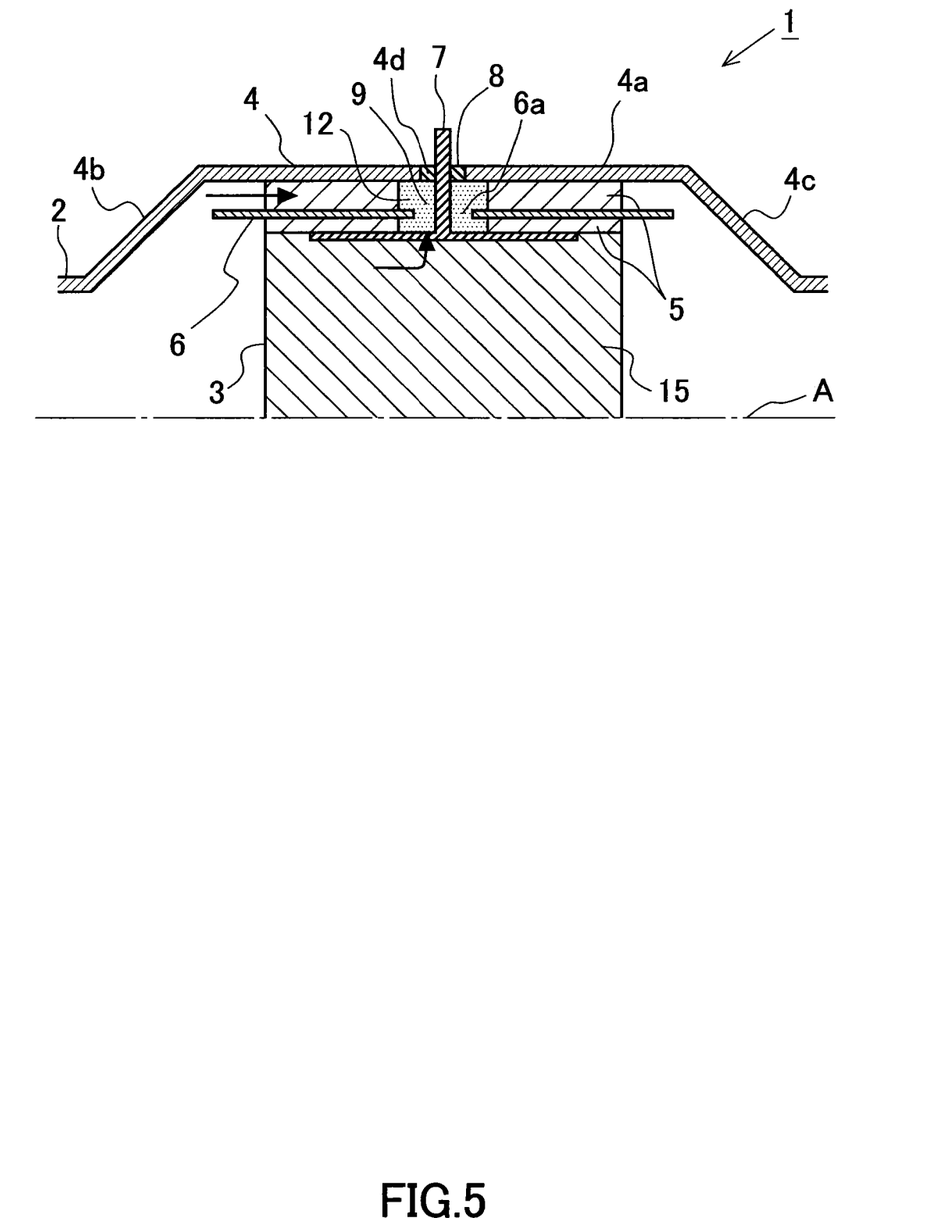
FIG. 5 shows a schematic arrangement of EHC according to a third embodiment.

FIG. 5 shows a schematic arrangement of EHC according to this embodiment. As shown in FIG. 5, in this embodiment, the interior of the electrode chamber 9 is filled with an occluding member 12. The occluding member 12 is formed of a highly airtight insulating material which has an airtightness higher than those of the material for forming the catalyst carrier 3 and the material for forming the mat 5 and which provides insulation from electricity, in the same manner as the occluding member 10 according to the first embodiment. The construction other than the above is the same as or equivalent to the construction of EHC according to the first embodiment.

Function and Effect of Construction of EHC According to this Embodiment

In FIG. 5, the arrows indicate the flows of the exhaust gas and the condensed water. Also in this embodiment, the electrode chamber 9 is occluded by the occluding member 12 having the high airtightness. Accordingly, the exhaust gas and the condensed water, which have passed through the mat 5 or the catalyst carrier 3, can be suppressed from invading the inside of the electrode chamber 9. Therefore, the decrease in the insulation resistance between the electrode 7 and the case 4 can be suppressed, which would be otherwise caused by the condensed water. Also in this embodiment, the occluding member 12 is hardly exposed to the exhaust gas. Therefore, it is possible to suppress the deterioration of the occluding member 12.

When the electrode chamber 9 is occluded by covering the wall surface of the electrode chamber 9 with the occluding member as in the first embodiment, it is necessary that the occluding member should be applied to the wall surface highly accurately. On the contrary, according to this embodiment, the electrode chamber 9 can be occluded by filling the interior of the electrode chamber 9 with the occluding member 12. Therefore, the electrode chamber 9 can be occluded more easily.

Fourth Embodiment

[Schematic Arrangement of EHC]

Figure 6:
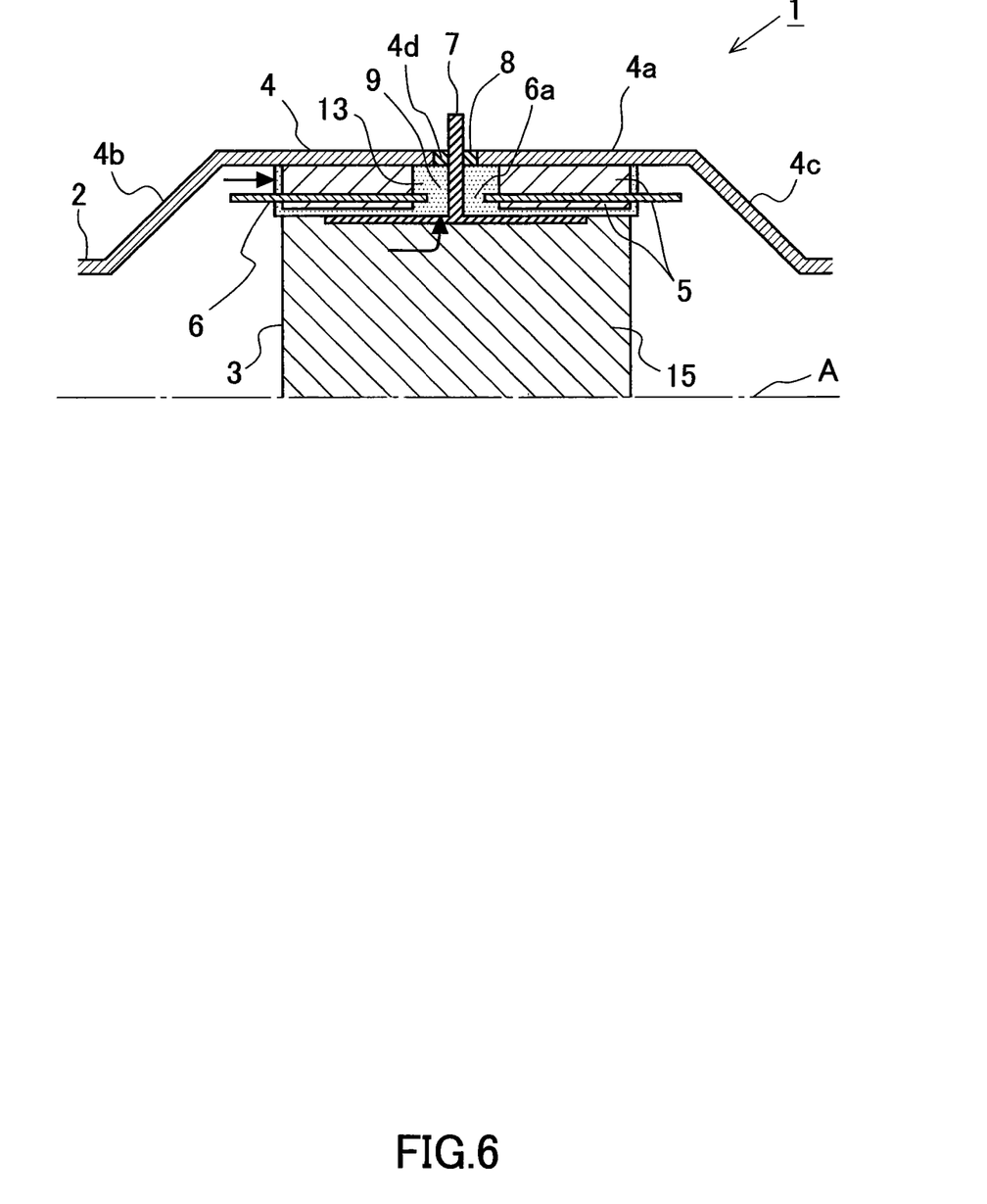
FIG. 6 shows a schematic arrangement of EHC according to a fourth embodiment.

FIG. 6 shows a schematic arrangement of EHC according to this embodiment. As shown in FIG. 6, in this embodiment, the interior of the electrode chamber 9 is filled with an occluding member 13, and the entire outer circumferential surface of the catalyst carrier 3 and the end surfaces of the mat 5 disposed on the upstream side and the downstream side are covered with the occluding member 13. The occluding member 13 is formed of a highly airtight insulating material which has an airtightness higher than those of the material for forming the catalyst carrier 3 and the material for forming the mat 5 and which provides insulation from electricity, in the same manner as the occluding member 10 according to the first embodiment. The construction other than the above is the same as or equivalent to the construction of EHC according to the third embodiment.

In this embodiment, the portion of the occluding member 13, with which the interior of the electrode chamber 9 is filled, corresponds to the first occluding member according to the present invention. Further, the portion of the occluding member 13 which covers the contact portion of the outer circumferential surface of the catalyst carrier 3 to be brought in contact with the mat 5 and the portions of the occluding member 13 which cover the end surfaces of the mat 5 disposed on the upstream side and the downstream side correspond to the second occluding member according to the present invention.

Function and Effect of Construction of EHC According to this Embodiment

In FIG. 6, the arrows indicate the flows of the exhaust gas and the condensed water. According to this embodiment, in the same manner as in the second embodiment, it is possible to suppress the invasion of the exhaust gas and the condensed water into the electrode chamber 9 from the mat 5 and the catalyst carrier 3, and it is also possible to suppress the invasion of the exhaust gas and the condensed water into the mat 5. Therefore, the exhaust gas and the condensed water can be suppressed from invading the inside of the electrode chamber 9 at a higher probability.

Modified Embodiment

Figure 7:
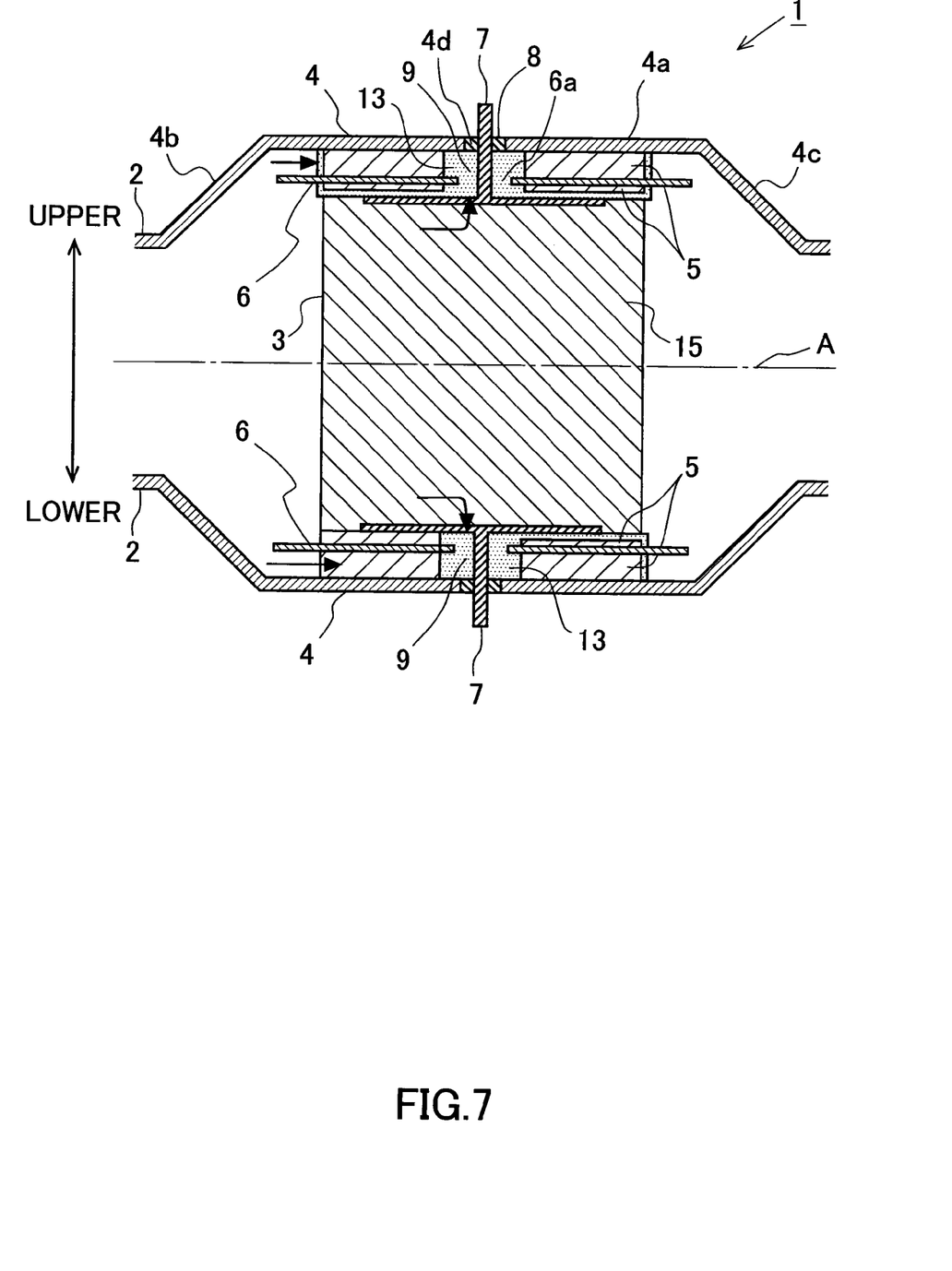
FIG. 7 shows a schematic arrangement of EHC according to a modified embodiment of the fourth embodiment.

FIG. 7 shows a schematic arrangement of EHC according to a modified embodiment of this embodiment. In the case of the construction of EHC shown in FIG. 6, the end surface of the mat 5, which is disposed on the upstream side, is also covered with the occluding member, in the same manner as the construction of EHC shown in FIG. 3. Therefore, the condensed water tends to stay in the vicinity of the end surface of the mat 5 disposed on the upstream side at the lower position in the case 4.

In view of the above, in this modified embodiment, as shown in FIG. 7, the occluding member 13 does not cover the portion of the outer circumferential surface of the catalyst carrier 3 which is disposed on the upstream side from the electrode chamber 9 and which is positioned at the lower position in the case 4 and the portion of the end surface of the mat 5 disposed on the upstream side which is positioned at the lower position in the case 4. In other words, in this modified embodiment, the interior of the electrode chamber 9 is filled with the occluding member 14, and the occluding member 14 covers the portion of the contact portion of the outer circumferential surface of the catalyst carrier 3 to be brought in contact with the mat 5 from which the portion disposed on the upstream side from the electrode chamber 9 and positioned at the lower position in the case 4 is excluded, the portion of the end surface of the mat 5 disposed on the upstream side from which the portion positioned at the lower position in the case 4 is excluded, and the end surface of the mat 5 disposed on the downstream side.

Accordingly, the condensed water, which is produced in the exhaust tube 2 disposed on the upstream side from EHC 1 and which flows into the lower portion in the case 4, easily enters the inside of the mat 5 from the lower portion of the end surface of the mat 5 disposed on the upstream side, in the same manner as in the modified embodiment of the second embodiment. Therefore, the condensed water can be absorbed and retained by the mat 5. Therefore, the condensed water is suppressed from staying in the vicinity of the end surface of the mat 5 disposed on the upstream side at the lower portion in the case 4. As a result, it is possible to suppress a large amount of the condensed water from flowing into the catalyst carrier 3 at once.

Also in this modified embodiment, the interior of the electrode chamber 9 is filled with the occluding member 14. Therefore, the condensed water, which is absorbed by the mat 5, is suppressed from invading the inside of the electrode chamber 9.

Also in this modified embodiment, it is also allowable that a condensed water absorbing member, which is different from the mat 5, is provided at the lower portion disposed on the upstream side from the electrode chamber 9 in the case 4.

Fifth Embodiment

[Schematic Arrangement of EHC]

Figure 8:
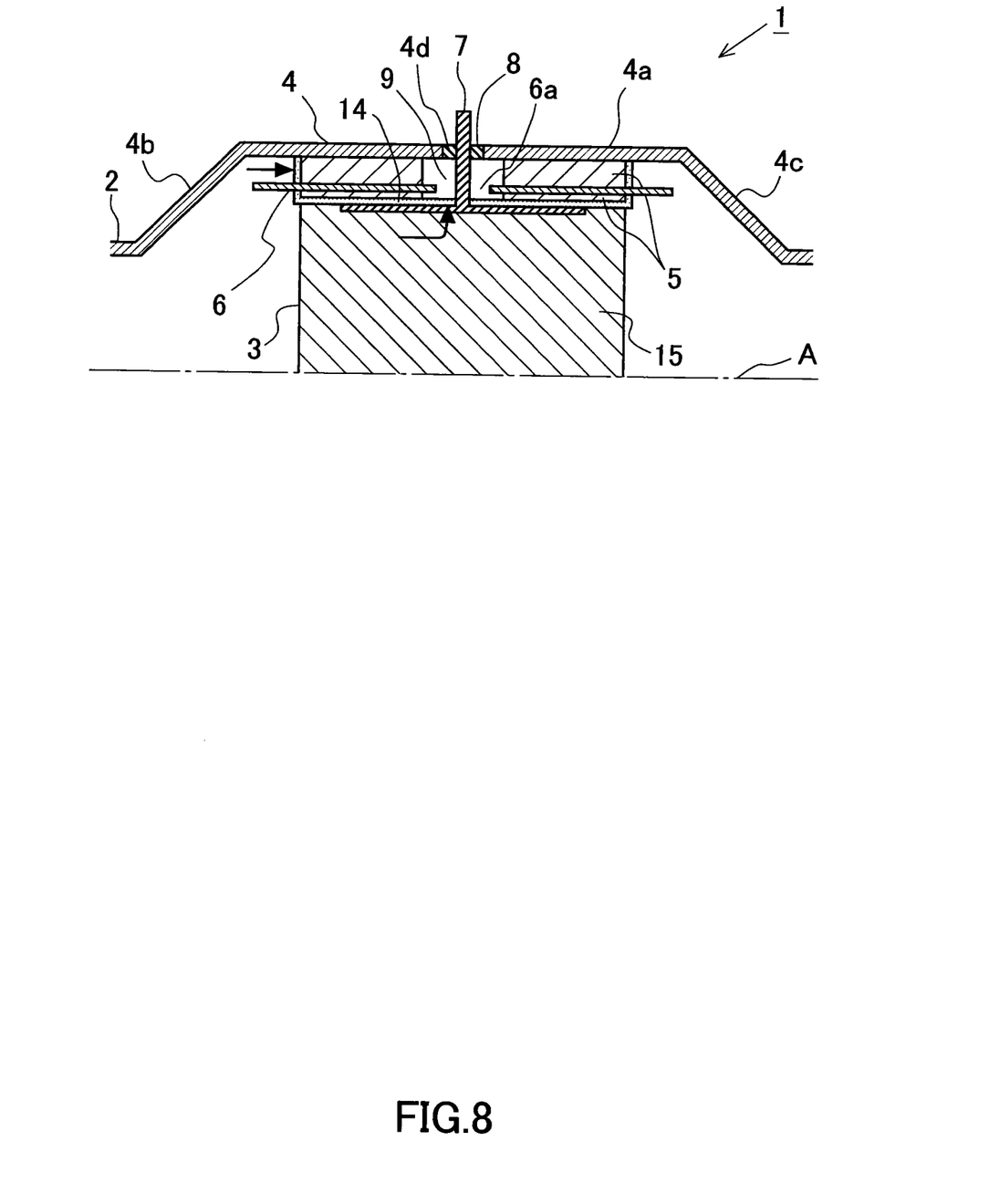
FIG. 8 shows a schematic arrangement of EHC according to a fifth embodiment.

FIG. 8 shows a schematic arrangement of EHC according to this embodiment. As shown in FIG. 8, in this embodiment, the entire outer circumferential surface of the catalyst carrier 3 and the end surfaces of the mat 5 disposed on the upstream side and the downstream side are covered with an occluding member 14. The occluding member 14 is formed of a highly airtight insulating material which has an airtightness higher than those of the material for forming the catalyst carrier 3 and the material for forming the mat 5 and which provides insulation from electricity, in the same manner as the occluding member 10 according to the first embodiment. The construction other than the above is the same as or equivalent to the construction of EHC according to the first embodiment.

Function and Effect of Construction of EHC According to this Embodiment

In FIG. 8, the arrows indicate the flows of the exhaust gas and the condensed water. According to this embodiment, it is possible to suppress the invasion of the exhaust gas and the condensed water into the electrode chamber 9 from the catalyst carrier 3. Further, it is possible to suppress the invasion of the exhaust gas and the condensed water into the mat 5. Therefore, it is possible to suppress the invasion of the exhaust gas and the condensed water into the electrode chamber 9.

DESCRIPTION OF THE REFERENCE NUMERALS AND SYMBOLS

1: electric heating catalyst (EHC), 3: catalyst carrier, 4: case, 5: mat, 6: inner tube, 7: electrode, 9: electrode chamber, 10, 11, 12, 13, 14: occluding member.

The invention claimed is:

1. An electric heating catalyst comprising:
a heat generating element which generates heat by applying electricity and which heats a catalyst by generating the heat;
a case which accommodates the heat generating element;
an insulating member which is provided between the heat generating element and the case, which supports the heat generating element, and which provides insulation from electricity;
an electrode which is connected to the heat generating element while passing through an electrode chamber and which supplies electricity to the heat generating element, the electrode chamber being a space positioned between an inner wall surface of the case and an outer circumferential surface of the heat generating element and the electrode chamber having a side wall surface formed by the insulating member; and
an occluding member which is formed of such a highly airtight insulating material that the highly airtight insulating material has an airtightness higher than those of the heat generating element and the insulating member, and the highly airtight insulating material provides insulation from electricity and which covers the outer circumferential surface of the heat generating element and end surfaces of the insulating member disposed on an upstream side and a downstream side.

2. The electric heating catalyst according to claim 1, further comprising an inner tube which is provided between the case and the heat generating element and which is supported by the insulating member while dividing the insulating member into those disposed on a case side and a heat generating element side.

3. The electric heating catalyst according to claim 1, further comprising an inner tube which is provided between the case and the heat generating element and which is supported by the insulating member while dividing the insulating member into those disposed on a case side and a heat generating element side.

4. The electric heating catalyst according to claim 1, further comprising an inner tube which is provided between the case and the heat generating element and which is supported by the insulating member while dividing the insulating member into those disposed on a case side and a heat generating element side.

5. The electric heating catalyst according to claim 1, wherein:
the occluding member, further, covers a portion of the outer circumferential surface of the heat generating element for forming a wall surface of the electrode chamber and a portion of the insulating member for forming the side wall surface of the electrode chamber.

6. The electric heating catalyst according to claim 1, wherein:
the electrode chamber, further, is filled with the occluding member.

* * * * *